United States Patent
Vishnoi et al.

(10) Patent No.: US 10,983,818 B2
(45) Date of Patent: Apr. 20, 2021

(54) METHOD AND SYSTEM FOR PREVENTING EXECUTION OF A DIRTY VIRTUAL MACHINE ON AN UNDESIRABLE HOST SERVER IN A VIRTUALIZATION CLUSTER ENVIRONMENT

(71) Applicant: SAMSUNG ELECTRONICS CO., LTD., Suwon-si (KR)

(72) Inventors: Suresh Vishnoi, Bangalore (IN); Kumar Vinod, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 16/031,581

(22) Filed: Jul. 10, 2018

(65) Prior Publication Data
US 2019/0065233 A1   Feb. 28, 2019

(30) Foreign Application Priority Data
Aug. 28, 2017   (IN) .............................. 201741030436

(51) Int. Cl.
| | |
|---|---|
| *G06F 9/46* | (2006.01) |
| *G06F 9/455* | (2018.01) |
| *G06F 21/51* | (2013.01) |
| *G06F 9/48* | (2006.01) |
| *H04L 29/08* | (2006.01) |

(Continued)

(52) U.S. Cl.
CPC ........ *G06F 9/45558* (2013.01); *G06F 9/4856* (2013.01); *G06F 12/08* (2013.01); *G06F 21/51* (2013.01); *H04L 9/3247* (2013.01); *H04L 67/1095* (2013.01); *H04L 67/2842* (2013.01); *G06F 2009/4557* (2013.01); *G06F 2009/45575* (2013.01)

(58) Field of Classification Search
CPC ..... G06F 9/45558; G06F 9/4856; G06F 12/08
See application file for complete search history.

(56) References Cited

U.S. PATENT DOCUMENTS

| | | | |
|---|---|---|---|
| 7,673,113 B2 * | 3/2010 | Sugumar ............... | G06F 9/5088 711/170 |
| 8,365,169 B1 | 1/2013 | Watson et al. | |

(Continued)

*Primary Examiner* — Camquy Truong
(74) *Attorney, Agent, or Firm* — Volentine, Whitt & Francos, PLLC (57) ABSTRACT

A method for preventing a dirty virtual machine from executing on an undesirable host server includes receiving, by a caching module provided for a first host server that hosts a virtual machine, a write data that is of the virtual machine and that is to be cached for the first host server. The virtual machine uses a virtual hard disk supporting hyper-V Virtual hard disk (VHDX) and virtual hard disk (VHD) file formats or any virtual file format with uniquely identifiable metadata. In response to the receipt of write data, the caching module provided for the first host server changes metadata of virtual hard disk files to a custom format before the virtual machine migrates from the first host server to a second host server, and the virtual machine becomes dirty as a result. When the dirty virtual machine sends a migration request to the second host server, a caching module provided for the second host server checks whether the custom format of the virtual hard disk files is identifiable. If not, then the second host server rejects the migration request initiated by the virtual machine.

18 Claims, 6 Drawing Sheets

(51) Int. Cl.
*H04L 9/32* (2006.01)
*G06F 12/08* (2016.01)

(56) References Cited

U.S. PATENT DOCUMENTS

| | | |
|---|---|---|
| 8,443,077 B1 * | 5/2013 | Lappas ................. G06F 3/0619 709/224 |
| 8,839,031 B2 | 9/2014 | Das et al. |
| 8,910,156 B1 | 12/2014 | Kenchammana-Hosekote et al. |
| 8,930,947 B1 | 1/2015 | Derbeko et al. |
| 9,032,157 B2 | 5/2015 | Ghai et al. |
| 9,058,123 B2 | 6/2015 | Joshi et al. |
| 9,081,686 B2 | 7/2015 | Beveridge |
| 10,684,876 B2 * | 6/2020 | Ryu .................... G06F 9/45558 |
| 2013/0139155 A1 * | 5/2013 | Shah ................... G06F 9/45558 718/1 |

\* cited by examiner

METHOD AND SYSTEM FOR PREVENTING EXECUTION OF A DIRTY VIRTUAL MACHINE ON AN UNDESIRABLE HOST SERVER IN A VIRTUALIZATION CLUSTER ENVIRONMENT

PRIORITY

This U.S. non-provisional patent application claims priority under 35 U.S.C. § 119 to Indian Patent Application No. 201741030436, filed on Aug. 28, 2017 in the Indian Intellectual Property Office, the entire contents of which are incorporated herein by reference.

BACKGROUND

1. Technical Field

The present disclosure generally relates to cache memories. More particularly, the present disclosure relates to a method and a system for preventing execution of a dirty virtual machine on an undesirable host server in a virtualization cluster environment.

2. Description of the Related Art

Computer memories can be characterized in different forms, including as slowest memories and fastest memories. The slowest memories may present farthest from a central processing unit (CPU) in a form of virtual memories, such as a hard disk drive or remote storage. The fastest memories may present nearest to CPU in a form of main memory, cache memories, and multiple (a plurality of) registers. Among these, the main memory is the slowest. The cache memories are used to store two types of data, namely a read-only data and read/write data. When read-only data is cached, data that is stored in and read from the main memory can be stored in a cache memory so that the next time the data needs to be read, it can be read from the (faster) cache memory rather than the (slower) main memory. An example of read-only data that is cached for the main memory is instructions for a program. Mostly, the read-only data is not prone to data loss since any data that gets corrupted in the cache memory can always be read from the main memory.

When read/write data is cached, data to be written to the main memory can instead or also be written to the cache memory. The way that a cache memory handles writes is called the "write policy" of the cache. There are different write policies, two of which are described below.

One such write policy is a write-back cache policy. When data is to be written to main memory at a first memory location that is instead currently cached, the new data is only written to a cache line of the cache memory, and not to the main memory. Correspondingly, if a second memory location needs to use the cache line where data is currently stored, the currently stored data needs to be saved—i.e., written back—to the first memory location of the main memory so that the cache line can be used by the second memory location of the main memory. Another write policy is a write-through cache policy. In this method, whenever data is to be written by a processor to main memory at a first location that is also currently cached, both the cache memory and the underlying memory location are updated. The write-back cache policy provides better performance than the write-through cache policy at the risk of memory integrity, as the write-back cache policy is prone to data loss due to cache errors.

Figure 1:
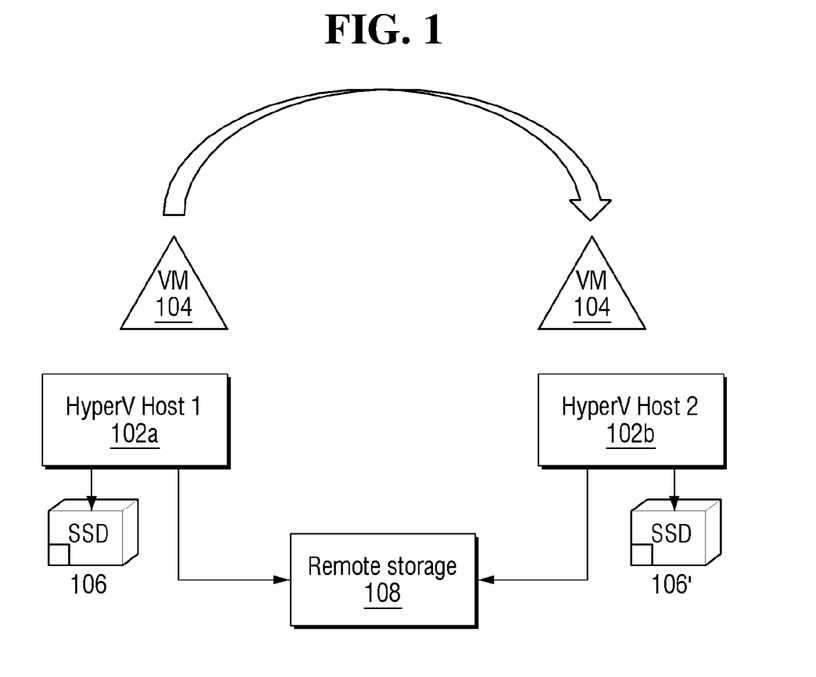
FIG. 1 illustrates an example high level view of a virtualization cluster ecosystem/environment.

One write-back caching solution, namely a single state drive (SSD) caching solution, is used in an example scenario shown in FIG. 1. FIG. 1 illustrates an example high level view of a virtualization cluster ecosystem/environment. The virtualization cluster environment provides infrastructure for running virtual machines (VMs) and other features such as high availability, shared storage, migrations on failure and so on. Virtual machines are an emulation of a computer system, and an example of a virtual machine is such an emulation that is designed to execute computer programs independent of platforms, i.e., without being necessarily tied only to a single platform. Some of the virtualization cluster ecosystems are HyperV, kernel-based virtual machine (KVM) Esxi etc. As shown in FIG. 1, the virtualization cluster eco-system includes N host servers, virtual machine VM and virtual machine VM', one or more single state drivers (SSDs) and a remote storage. As illustrated, the virtual machine VM may be hosted on a host server, e.g., HyperV Host 1 102a, and may migrate to HyperV Host 2 102b. All the N host servers are HyperV enabled and support Hyper-V virtual hard disk (VHDX) and VHD file formats in the one or more virtual machines hosted one (connected to) the N host servers. The N host server can have any virtual platform support which does metadata based detection for any file format.

Sometimes, the virtual machine VM migrates from a first host server, e.g., HyperV Host 1 102a, to a second host server, e.g., HyperV Host 2 102b, due to resource grant or connectivity failure. In the failure of connectivity, the first host server would not come to know about virtual machine migration. The write-back caching solution in the SSD flushes dirty data before the virtual machine VM is shown as "started" with the second host server. There are also cases where the virtual machine VM in the cluster environment can migrate to and run on a host server where a caching solution is not present or not enabled. If a dirty virtual machine VM starts on a host server that lacks a caching solution and if dirty data is not flushed, a user would see a corrupt virtual machine.

Several solutions exist in the art for addressing the above issue. One such solution provides a cluster that keep polling new hosts as to whether they have a caching solution, and hosts that lack caching solutions are eventually removed by the virtualization cluster ecosystem. However, polling might hang a virtualization cluster ecosystem or there could be a polling time window where a dirty virtual machine VM chooses the host without a caching solution before polling detects that the host lacks a caching solution. Another solution provides virtualization platforms with inbuilt support to create module dependency by changing their virtualization cluster ecosystem. However, some platforms do not provide such support to virtual machines.

Currently, there exists no solution to prevent dirty virtual machines from executing on an undesirable host server that lacks any platform support.

Therefore, there is a need for a method and a system to prevent a dirty virtual machine from executing on an undesirable host server in a Hyper-Virtual environment.

The above-mentioned shortcomings, disadvantages and problems are addressed herein and which will be understood by reading and studying the following specification.

SUMMARY

According to an aspect of the present disclosure, a method of preventing execution of a virtual machine having dirty data on an undesirable host server in a virtualization cluster environment includes receiving, by a caching module of a first host server, a write data that is of a virtual machine and that is to be cached for the first host server, wherein the virtual machine comprises virtual hard disk files of a virtual hard disk supporting at least one virtual hard disk file format of hyper-V Virtual hard disk (VHDX) and virtual hard disk (VHD). The method also includes changing, by the caching module of the first host server, metadata of the virtual hard disk files to a custom format after receiving the write data, and initiating, by the virtual machine, a migration request to establish communication with a second host server when the virtual machine loses connection with the first host server. The method further includes checking, by the second host server, whether the custom format of the virtual hard disk files is identifiable, and rejecting, by the second host server, the migration request initiated by the virtual machine if the custom format of the virtual hard disk files is not identifiable.

According to another aspect of the present disclosure, a host server includes a processor and a memory having a caching module. The caching module is adapted for receiving a write data that is of a virtual machine and that is to be cached for a first host server, wherein the virtual machine comprises virtual hard disk files of a virtual hard disk supporting virtual hard disk file formats including hyper-V Virtual hard disk (VHDX) and virtual hard disk (VHD) file. The caching module is also adapted for changing metadata of virtual hard disk files of the virtual hard disk to changed metadata of the virtual hard disk files with a custom format after receiving the write data, and enabling the virtual machine to migrate to another host server with the changed metadata of the virtual hard disk files.

BRIEF DESCRIPTION OF THE ACCOMPANYING DRAWINGS

The other objects, features and advantages will occur to those skilled in the art from the following description of the preferred embodiment and the accompanying drawings in which.

DETAILED DESCRIPTION OF THE DISCLOSURE

The present disclosure provides a method and a system for preventing an execution of a dirty virtual machine on an undesirable host server. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Throughout the document, the term "undesirable host server" refers to a host server that lacks a write-back caching solution or platform support. Further, throughout the document, the terms "host machine" and "host server" are interchangeably used.

The present disclosure describes a method for preventing execution of a virtual machine having dirty data on an undesirable host server in a virtualization cluster environment. In one embodiment, a host server includes or is provided with cache memory such as a solid-state drive (SSD) for caching data associated with the virtual machine. The cache memory such as the SSD adapts a write-back caching solution where data associated with the virtual machine are first written into cache memory and can then be written to a memory location in a main memory of the host server such as when space in the cache memory is needed by another memory location in the main memory. Insofar as the virtual machine executes on a host such as a host server, the main memory of the host such as the host server may be considered a main memory of the virtual machine. That is, the main memory of the host such as the host server may be used by, assigned to, dedicated fully or partially for use by, or otherwise tied to the virtual machine. Additionally, insofar as the cache memory such as the SSD is used by the virtual machine, the cache memory such as the SSD may be considered a cache memory such as an SSD of the virtual machine. That is, the cache memory such as the SSD may be used by, assigned to, dedicated fully or partially for use by, or otherwise tied to the virtual machine.

In some embodiments, the cache memory such as the SSD may reside outside of the host server. In some other embodiments, the cache memory such as the SSD may form an integral component on the host server. The data in the cache memory such as the SSD which matches the data in a corresponding memory location in a main memory of the host such as the host server is called clean data and data in the cache memory which does not match the data in a corresponding memory location in the main memory is called dirty data. In other words, the recent memory data that is stored in the cache memory of (used by, assigned to, dedicated fully or partially for use by) the virtual machine is called dirty data when it does not match the data in the corresponding memory location in the main memory.

Sometimes, the virtual machine having the dirty data may migrate from a first host machine to a second host machine either due to resource grant by the first host machine or connection failure with the first host machine. In some embodiments, the host machine is at least one of a computing device and a server.

Figure 2:
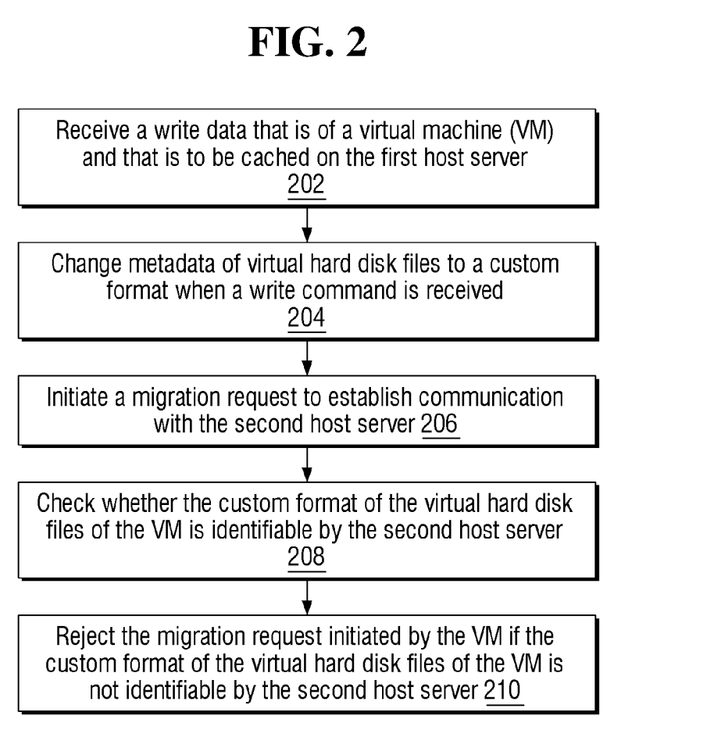
FIG. 2 is a flow chart diagram illustrating a method of preventing dirty virtual machine execution on an undesirable host server, according to one embodiment.

FIG. 2 is a flow chart diagram illustrating a method of preventing dirty virtual machine execution on an undesirable host server, according to one embodiment. Depending on the embodiment, additional steps may be added, others removed, and the ordering of the steps may be changed. At step 202, a write data that is associated with a virtual machine and that is to be cached is received by a caching module of a first host server. The caching module then caches the write data associated with the virtual machine. In one embodiment, the caching module may present in a caching device such as solid-state drive (SSD) for caching data of input/output (I/O) operations of the virtual machine. In this embodiment, the caching device may present externally to the host server. The I/O operations comprise at least one of a read operation and a write operation. The data for the I/O operations is stored in a virtual hard disk of (used by, assigned to, dedicated fully or partially for use by) the virtual machine. The hard disk of the virtual machine supports both Hyper-V virtual hard disk (VHDX) and VHD file formats. Thus, the write data received in step 202 is cached as a VHDX file or a VHD file in the caching module of the SSD. At step 204, metadata of VHDX and VHD files are changed by the caching module of the SSD of the first host server to a custom format when the write command is received. The metadata of the VHDX and VHD files are changed to the custom format such that it can be recognized by any host server having a caching module. In one embodiment, the virtual machine can support any type of file format which has metadata based detection techniques. The custom format may be one of a set of custom formats pre-arranged for the virtualization cluster ecosystem/environment that includes the first host server and other host servers, so that host servers to which a virtual machine migrates will be accepted. The custom format is different than the original format of the metadata of the VHDX and VHD files, and may be used to replace multiple different original formats.

Now, consider that the connection between the first host server and the virtual machine is lost. Therefore, the virtual machine tends to migrate from the first host server to a second host server. Since the write data associated with the virtual machine is not flushed into a main memory of the current host of (used by, assigned to, dedicated fully or partially for use by) the virtual machine before migration, the virtual machine becomes dirty. At step 206, a migration request is initiated by the dirty virtual machine to establish communication with a second host server. The second host server includes or is provided with a caching device such as a SSD for caching data of I/O operations of the virtual machine. The caching device further includes a caching module to identify custom format of the VHDX and VHD files. Therefore, at step 208, the caching module checks whether the custom format of the VHDX and VHD files of the virtual machine is identifiable by the second host server. If the custom format of the VHDX and VHD files of the virtual machine is not identifiable, at step 210, the migration request initiated by the virtual machine is rejected by the second host server, thereby preventing the virtual machine from executing on the second host server.

Figure 3:
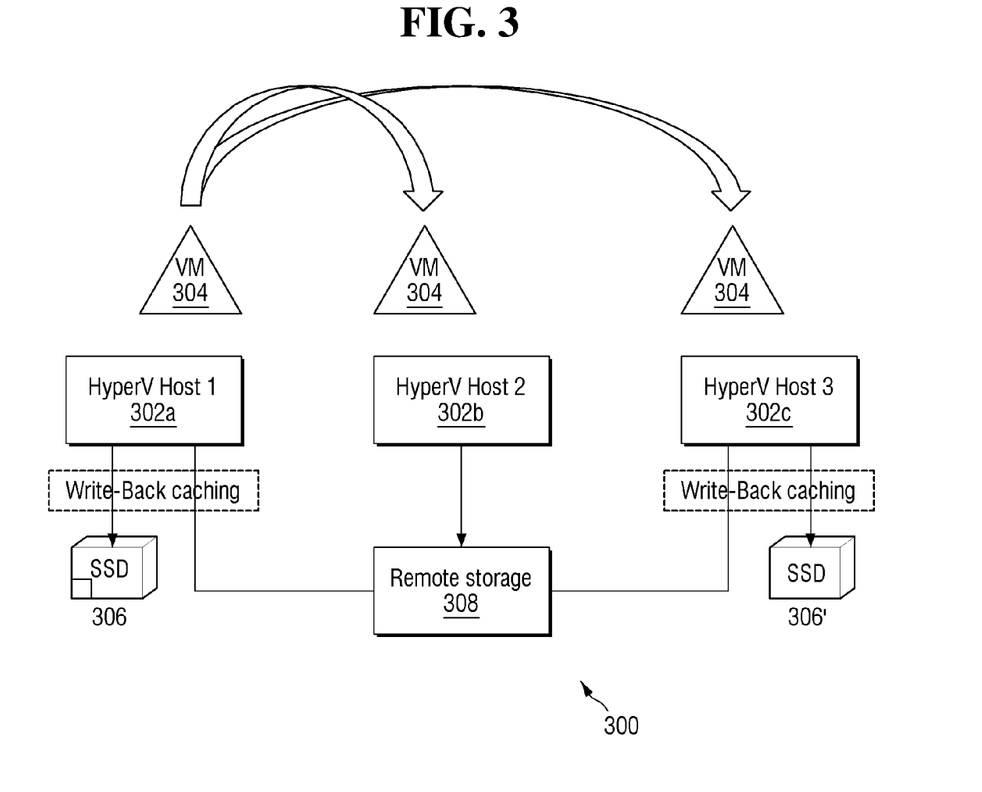
FIG. 3 is a system diagram illustrating a virtualization cluster environment for preventing dirty data execution of a virtual machine on an undesirable host server, according to one embodiment.

FIG. 3 is a system diagram illustrating a virtualization cluster environment for preventing dirty data execution of a virtual machine on an undesirable host server, according to one embodiment. The virtualization cluster environment 300 includes at least three host servers, i.e., host 302*a*, host 302*b*, and host 302*c*. The virtualization cluster environment 300 also includes a caching device (SSD 306) and a caching device (SSD 306'), as well as virtual machine 304 and virtual machine 304', and a remote storage 308 which is shared. The virtual cluster environment 300 provides infrastructure for running virtual machines and provides features such as high availability, shared storage, migrations on host failure and so on. The high availability feature enables a virtual machine to run on another host machine if the connection with the current host device fails. Some of the virtualization cluster environment 300 includes, but is not limited to, HyperV, kernel-based virtual machine (KVM), Esxi etc.

In one embodiment, multiple virtual machines run on/in the virtualization cluster environment and the movement of the virtual machines is managed based on cluster management policies. The virtual machine 304 and virtual machine 304' may be assigned hard disk resources to implement a virtual hard disk (VHD) that provides storage space for each or either of the virtual machine 304 and virtual machine 304'. A single virtual machine among virtual machine 304 and virtual machine 304' may be provided with multiple virtual hard disks (VHDs), each of which in turn may have access to memory resources of (actual) hard disks. The virtual machine 304 and virtual machine 304' support hyper-Virtual hard disk (VHDX) and VHD file formats and caching is enabled for all VHDs used by the virtual machine 304 and virtual machine 304'. The VHDX and VHD files are of Windows file formats adapted for the virtual machine 304 and virtual machine 304'. The virtual machine 304 is also capable of supporting any type of file formats such as raw, qcow, vmdk on VMware etc., that can be identified using metadata based detection techniques. Each of these file formats may have their own uniquely identifiable metadata such as signature, strings and the like to store data of I/O operations in the VHD of the virtual machine. One or more signatures of metadata of virtual hard disk files may include a specific unique string that is uniquely correlated with one or more virtual hard disk file. The specific unique string may be a set of characters recognized/recognizable to ta caching device. In one embodiment, the caching device is attached to the host 302a and/or the host 302c for increasing input/output operations per second (IPOS) for the virtual machine 304 and virtual machine 304'.

A caching module is present in a caching device (SSD 306) for caching data of one or more I/O operations of the virtual machine 304. A caching module is also present in another caching device (SSD 306') as explained later. The caching module uses a write-back caching solution for caching data of I/O operations of the virtual machine. The caching module is further adapted for changing metadata associated with VHDX and VHD files when a write command having write data is received, the metadata being at least one of a signature and a string. Thus, when a write command is received, the metadata of the VHDX and VHD files is changed to a custom format. The metadata is changed to the custom format to make sure that host servers that have a caching module are able to identify the custom format of the VHDX and VHD files in the virtualization custom environment.

In this scenario, consider that the virtual machine 304 migrates from host 302a to host 302b before the caching module in the caching device (SSD 306) flushes the write data to the VHD/VHDX file of the virtual machine. The host 302a may be a hyperV host, the host 302b may be a hyperV host, and the host 302c may be a hyperV host. Since, the write data is not flushed, the virtual machine 304 becomes dirty and the caching module in the caching device (SSD 306) changes metadata of the VHDX and VHD files to the custom format. As shown in FIG. 3, when the virtual machine 304 initiates a migration request to host 302b, the host 302b checks in response whether it can identify the custom format of the VHDX and VHD files. Since, the host 302b does not have the write-back caching, the host 302b does not understand the virtual machine 304 and rejects the migration request received from the virtual machine 304.

Now, the virtual machine 304 makes a next migration attempt in the virtualization cluster environment 300. The virtual machine 304 searches for the next host server and eventually finds host 302c. The host 302c checks whether the custom format of the VHDX and VHD files is identifiable. Since, the host 302c has write-back caching, host 302c understands the virtual machine 304 and accepts the migration request received from the virtual machine 304. In one embodiment, the signature of VHDX and VHD files in custom format is converted back to the original format of the metadata of the VHDX and VHD files of the dirty virtual machine. Then, the dirty data of the virtual machine 304 is synced on the host 302c. In one embodiment, the caching module present in the caching device (SSD 306') of/for the host 302c obtains the dirty data of the virtual machine 304 from a different server which has replicated the cached data of the virtual machine 304.

Figure 4A:
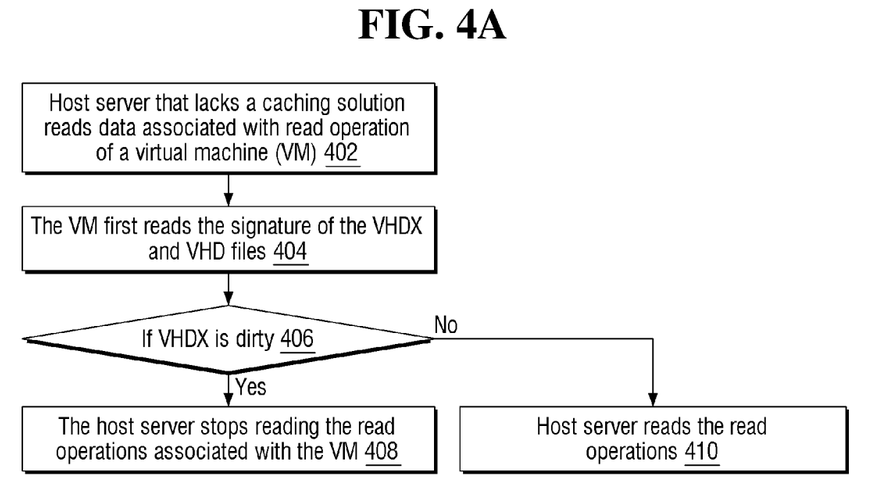
FIGS. 4A to 4D are flow diagrams illustrating an example method of a host server for executing read/write operations of a virtual machine in a virtualization cluster environment, according to one embodiment.

FIGS. 4A to 4D are flow diagrams illustrating an example method of a host server for executing read/write operations of a virtual machine in a virtualization cluster environment, according to one embodiment. FIG. 4A illustrates an example method of a host server for executing a read operation of a virtual machine, according to one embodiment. In this embodiment, consider that the host server does not have a caching solution/module. The step by step process being carried out in preventing the dirty virtual machine from executing is explained herein as follows. At step 402, a host server attempts to read data associated with a read operation of a virtual machine. The data of the read operation is stored in one of VHDX file format and VHD file format in a virtual hard disk (VHD) of the virtual machine. The virtual machine first reads the signature of the VHDX and VHD files at step 404. Since, the host server does not have a caching module, a platform of the host server checks whether the VHDX/VHD file is dirty. In other words, at step 406 the platform of the host server checks whether the VHDX/VHD file has any data that is to be flushed. If the VHDX/VHD file is dirty, at step 408, the host server stops the read operation associated with the virtual machine. If the VHDX/VHD file is not dirty, at step 410, the host server performs the read operation associated with the virtual machine. It is to be noted that the host server is capable of accessing any file format whose signature can be detected using metadata based detection.

Figure 4B:
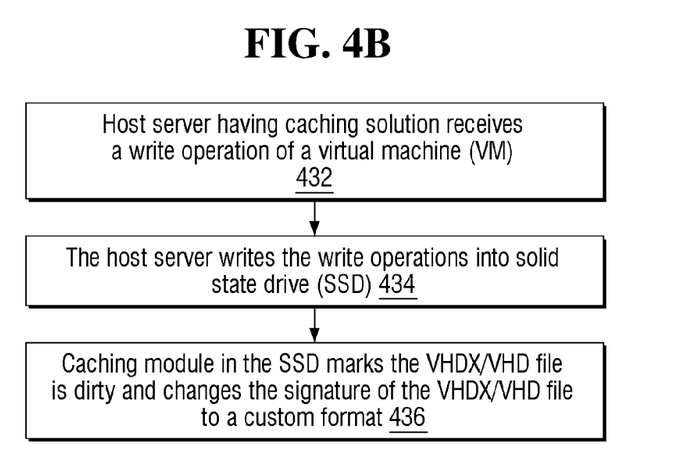

FIG. 4B illustrates an example method of a host server for executing a write operation of a virtual machine, according to another embodiment. In this embodiment, consider that the host server has a caching solution/module. The step by step process being carried out in preventing the dirty virtual machine from executing is explained herein as follows. At step 432, a host server having the caching module receives a write operation associated with a virtual machine. The host server writes the data of the write operations into a caching device such as a solid-state drive (SSD). This is performed at step 434. The data of the write operations is written to the SSD in the form of VHDX and VHD files. Further, at step 436, the caching module in the SSD marks that the VHDX/VHD file is dirty and changes the signature of the VHDX/VHD file to a custom format.

Figure 4C:
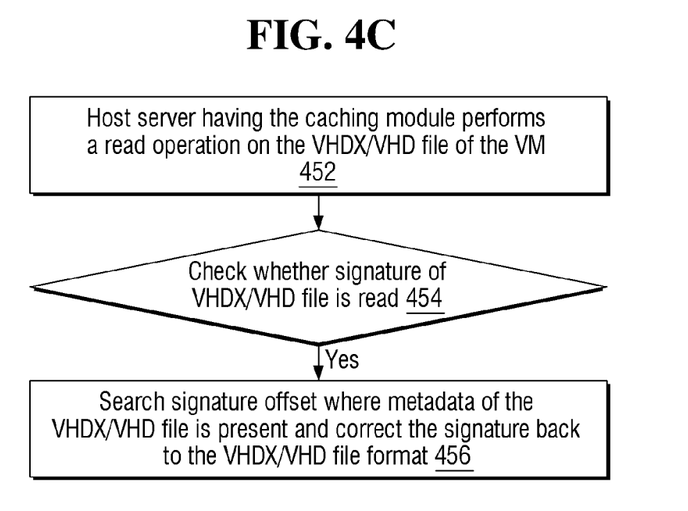

FIG. 4C is a flow diagram illustrating an example method of a host server for executing a read operation of a virtual machine, according to another embodiment. In this embodiment, consider that the host server having a caching module attempts to read a write operation as executed in FIG. 4B even though the signature of VHDX/VHD file is changed. Therefore, at step 452, the host server having the caching module performs a read operation on the VHDX/VHD file of the virtual machine. At step 454, it is checked whether the caching module of the host server is reading a signature of the VHDX/VHD file or some other data file. If a signature of the VHDX/VHD file is read, then the caching module searches the signature offset where the metadata of the VHDX/VHD file is present and corrects the signature back to the VHDX/VHD file format. This is performed at step 456. It is to be noted that the host server can have any virtual platform support which does metadata based detection for any file format other than VHDX and VHD file formats.

Figure 4D:
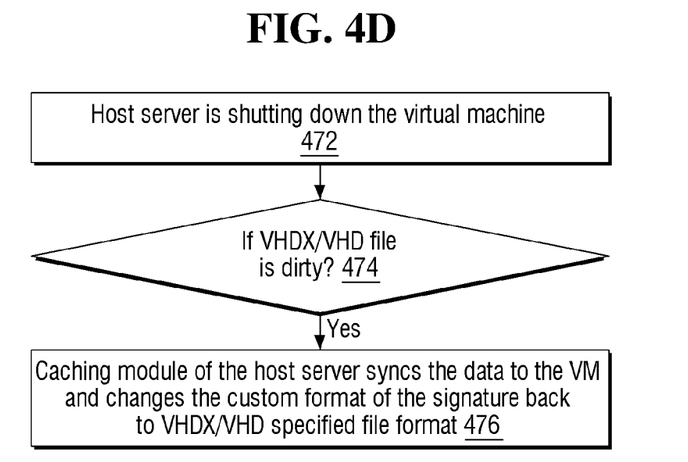

FIG. 4D is a flow diagram illustrating an example method of a host server in preventing a dirty virtual machine from executing when the virtual machine is shut down by a host server, according to one embodiment. At step 472, the host server attempts to shut down the virtual machine. While shutting down the virtual machine, the host server at step 474, checks whether the VHDX/-VHD file present in the virtual machine is dirty. To check this, the caching module verifies whether the signature of the VHDX/VHD file is in the custom format. If yes, at step 476, the caching module of the host server syncs the data to the virtual machine and changes the custom format of the signature back to VHDX/VHD specified file format. In an embodiment, the caching module obtains dirty virtual machine data from a different server which has a replica of the cached data of the virtual machine and syncs the obtained dirty data with the host server to which the virtual machine is currently connected.

Figure 5:
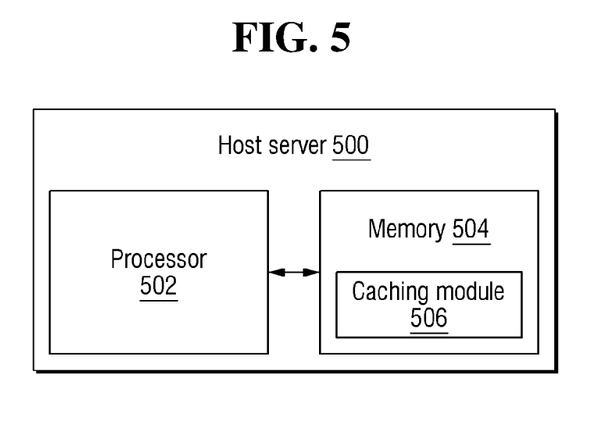
FIG. 5 is a block diagram illustrating one or more components of a host server used in a virtualization cluster environment, according to one embodiment.

FIG. 5 is a block diagram illustrating one or more components of a host server used in a virtualization cluster environment, according to one embodiment. As shown in FIG. 5, the host server 500 comprises of a processor 502, and a memory 504. The memory 504 further includes a caching module 506 for caching one or more input/output operations of a virtual machine.

The processor 502 is adapted for performing one or more instructions stored in the memory 504. In one embodiment, the processor 502 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the processor 502, in this disclosure, may be embodied as software, firmware, hardware or any combination thereof.

The memory 504 may, in some examples, be described as a computer-readable storage medium. The memory 504 may be a volatile memory, meaning that the memory 504 does not maintain stored contents when the computer is turned off. Examples of volatile memories include random access memories (RAM), dynamic random-access memories (DRAM), static random-access memories (SRAM), and other forms of volatile memories known in the art. In some examples, the memory 504 may be used to store program instructions for execution by processor 502. For example, the memory 504 includes the caching module stored in the form of program instructions for execution by the processor 502.

The caching module 506 is adapted for caching data of one or more input/output operations of the virtual machine. The caching module 506 is also adapted for changing metadata of VHDX and VHD files to a custom format when a write data is received. The caching module 506 performs changing of metadata of VHDX and VHD files to a custom format to ensure that execution of the virtual machine on any undesirable host server in the virtualization cluster environment 300 is prohibited. Thus, the present disclosure ensures safety of the virtual machine till the dirty data is flushed. The present disclosure also prevents data corruption in writeback caching in/on the virtualization cluster environment.

The foregoing description of the present disclosure has been provided for the purposes of illustration and description. It is not intended to be exhaustive or to limit the disclosure to the precise forms disclosed. Many modifications and variations will be apparent to the practitioner skilled in the art. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence. Examples of modifications and variations within the scope of the present disclosure are provided in the paragraphs that follow.

According to one embodiment, the virtual machine migrates from the first host server to the second host server when the first host server is unable to grant resources or is unable to provide connectivity to the virtual machine.

According to another embodiment, the metadata of the virtual hard disk files includes at least one signature.

According to still another embodiment, the at least one signature of the metadata of the virtual hard disk files includes a specified unique string.

According to one embodiment, the method further includes converting the at least one signature of the metadata of the virtual hard disk files to the custom format. The custom format includes a set of characters recognized by the caching module According to another embodiment, the virtual machine after the rejecting of the migration request performs at least one of: an attempt to reconnect with the first host server, and an attempt to connect with a host server having a caching module identified by a virtualization cluster environment.

According to still another embodiment, the method further includes converting the at least one signature of the metadata of the virtual hard disk files in the custom format back to virtual hard disk files of the virtual machine having dirty data, and syncing dirty data of the virtual machine having dirty data on the second host server if the custom format of the virtual hard disk files is identifiable by the second host server.

According to yet another embodiment, the syncing of the virtual machine having dirty data includes obtaining dirty data of a virtual machine having dirty data from a different server which is a replica server for cached data of the virtual machine having dirty data.

According to another embodiment, the second host server is capable of operating on any virtual platform that supports metadata based detection for any file format.

According to still another embodiment, the method further includes attempting, by the second host server, to read data associated with a read operation of the virtual machine, wherein the second server does not have the caching module. The method also includes reading, by the second server, a signature of the virtual hard disk (VHD) of the virtual machine and checking, by the second host server, whether the at least one virtual hard disk file format is identifiable, and stopping, by the second host server, reading of data associated with the read operation of the virtual machine if the at least one virtual hard disk file format is not identifiable.

What is claimed is:

1. A method of preventing execution of a virtual machine having dirty data on an undesirable host server in a virtualization cluster environment, the method comprising:

receiving, by a caching module of a first host server, a write data that is of-a the virtual machine (VM) and that is to be cached for the first host server, wherein the virtual machine comprises virtual hard disk files of a virtual hard disk supporting at least one virtual hard disk file format of hyper-V Virtual hard disk (VHDX) and virtual hard disk (VHD);

changing, by the caching module of the first host server, metadata of the virtual hard disk files of the virtual hard disk to a custom format after receiving the write data, wherein the metadata of the virtual hard disk files comprises a specified unique string:

initiating, by the virtual machine, a migration request to establish communication with a second host server when the virtual machine loses connection with the first host server and after the changing of the metadata of the virtual hard disk files to the custom format:

attempting, by the second host server, reading data associated with a read operation of the virtual machine:

reading, by the second host server, the specified unique string of the virtual hard disk (VHD) of the virtual machine:

checking, by the second host server, whether the custom format of the metadata of the virtual hard disk files is identifiable; and rejecting, by the second host server, the migration request initiated by the virtual machine if the custom format of the virtual hard disk files is not identifiable.

2. The method of claim 1, wherein the virtual machine migrates from the first host server to the second host server when the first host server is unable to grant resources or is unable to provide connectivity to the virtual machine.

3. The method of claim 1, wherein the metadata of the virtual hard disk files comprises at least one signature comprising the specified unique string.

4. The method of claim 3, further comprising:
converting the at least one signature of the metadata of the virtual hard disk files to the custom format; wherein the custom format includes a set of characters recognized by the caching module.

5. The method of claim 1, wherein the virtual machine after the rejecting of the migration request performs at least one of:
an attempt to reconnect with the first host server; and
an attempt to connect with a host server having the caching module identified by a cluster.

6. The method of claim 3, further comprising:
converting the at least one signature of the metadata of the virtual hard disk files in the custom format back to the virtual hard disk files of the virtual machine having the dirty data; and
syncing the dirty data of the virtual machine having the dirty data on the second host server if the custom format of the virtual hard disk files is identifiable by the second host server.

7. The method of claim 6, wherein the syncing dirty data of the virtual machine having the dirty data comprises:
obtaining the dirty data of the virtual machine having the dirty data from a different server which replicates cached data of the virtual machine having the dirty data.

8. The method of claim 1, wherein the second host server is capable of operating on any virtual platform that supports the metadata based detection for any file format.

9. The method of claim 1, further comprising:
attempting, by the second host server, reading data associated with a read operation of the virtual machine, wherein the second host server does not have the caching module;
reading, by the second host server, a signature of the virtual hard disk (VHD) of the virtual machine;
checking, by the second host server, whether the at least one virtual hard disk file format is identifiable; and
stopping, by the second host server, reading of the data associated with the read operation of the virtual machine if the at least one virtual hard disk file format is not identifiable.

10. A host server system comprising a first host server and a second host server, the first host server comprising: a processor: and
a memory having a caching module, adapted for wherein the caching module is configured to receive receiving a write data that is of a virtual machine (VM) and that is to be cached for-a the first host server, wherein the virtual machine comprises virtual hard disk files of a virtual hard disk supporting at least one virtual hard disk file format of formats including hyper-V Virtual hard disk (VHDX) and virtual hard disk (VHD);
the caching module is configured to change changing metadata of the virtual hard disk files of the virtual hard disk to changed metadata of the virtual hard disk files with a custom format after receiving the write data, wherein the metadata of the virtual hard disk files comprises a specified unique string: -and
the virtual machine is configured to enabling the virtual machine to migrate to initiate a migration request to establish communication with the second another host server when the virtual machine loses connection with the first host server and after the with the changed metadata of the virtual hard disk files is changed: and
the second host server is configured to check whether the custom format of the metadata of the virtual hard disk files is identifiable, to attempt to read data associated with a read operation of the virtual machine, to read the specified unique string of the virtual hard disk (VHD) of the virtual machine, and to reject the migration request initiated by the virtual machine if the custom format of the virtual hard disk files is not identifiable.

11. The host server system as claimed in claim 10, wherein the caching module is further adapted for:
receiving a migration request of the virtual machine to establish communication with the second host server when the virtual machine loses connection with the first host server;
checking whether the custom format of the virtual hard disk files is identifiable; and
rejecting the migration request initiated by the virtual machine if the custom format of the virtual hard disk files is not identifiable.

12. A method of preventing execution of a virtual machine having dirty data on an undesirable host server in a virtualization cluster environment, the method comprising:
receiving, by a second host server from the virtual machine comprising virtual hard disk files of a virtual hard disk, a migration request to migrate the virtual machine from a first host server after metadata of the virtual hard disk files is changed by a caching module of the first host server upon receiving write data to be cached, wherein the metadata of the virtual hard disk files comprises a specified unique string;
checking, by the second host server, whether a custom format of the virtual hard disk files of the virtual machine is identifiable;
attempting, by the second host server, reading data associated with a read operation of the virtual machine;
reading, by the second host server, the specified unique string of the virtual hard disk (VHD) of the virtual machine;
rejecting, by the second host server, the migration request from the virtual machine if the custom format of the virtual hard disk files is not identifiable,
wherein the custom format is a format of the metadata of the virtual hard disk files changed by the caching module of the first host server upon receiving write data to be cached, and
wherein the virtual machine comprises virtual hard disk files of the virtual hard disk that supports at least one hard disk file format of hyper-V Virtual hard disk (VHDX) and virtual hard disk (VHD).

13. The method of claim 12, wherein the virtual machine migrates from the first host server to the second host server when the first host server is unable to grant resources or is unable to provide connectivity to the virtual machine.

14. The method of claim 12, wherein the metadata of the virtual hard disk files comprises at least one signature.

15. The method of claim 12, wherein the virtual machine identifies the second host server from a cluster, and attempts to connect with the second host server based on the second host server having the caching module.

16. The method of claim 14, further comprising:
converting the at least one signature back to the virtual hard disk file of the virtual machine having the dirty data; and syncing the dirty data of the virtual machine having the dirty data on the second host server.

17. The method of claim 16, wherein syncing the dirty data of the virtual machine having the dirty data comprises:
obtaining the dirty data of the virtual machine having the dirty data from a different server which replicates the cached write data of the virtual machine having the dirty data.

18. The method of claim 12, wherein the second host server is capable of operating on any virtual platform that supports the metadata based detection for any file format.

* * * * *